US012576378B2

(12) United States Patent
Ivarsson et al.

(10) Patent No.: US 12,576,378 B2
(45) Date of Patent: Mar. 17, 2026

(54) OUTFLOW UNIT FOR MIXER

(71) Applicant: Sanso Mixing AB, Hörby (SE)

(72) Inventors: Nemo Ivarsson, Enskede (SE); Mats Andersson, Hörby (SE)

(73) Assignee: SANSO MIXING AB, Horby (SE)

( * ) Notice: Subject to any disclaimer, the term of this patent is extended or adjusted under 35 U.S.C. 154(b) by 607 days.

(21) Appl. No.: 17/631,976

(22) PCT Filed: Aug. 14, 2020

(86) PCT No.: PCT/SE2020/050784
§ 371 (c)(1),
(2) Date: Feb. 1, 2022

(87) PCT Pub. No.: WO2021/034252
PCT Pub. Date: Feb. 25, 2021

(65) Prior Publication Data
US 2022/0274074 A1 Sep. 1, 2022

(30) Foreign Application Priority Data
Aug. 16, 2019 (SE) .................................... 1950940-5

(51) Int. Cl.
*B01F 35/75* (2022.01)

(52) U.S. Cl.
CPC ................................ *B01F 35/7549* (2022.01)

(58) Field of Classification Search
CPC .................................................. B01F 35/7549
USPC ............. 366/195; 239/597, 598; 210/497.01; 425/464
See application file for complete search history.

(56) References Cited

U.S. PATENT DOCUMENTS

| | | | | | |
|---|---|---|---|---|---|
| 20,357 | A * | 5/1858 | McCammon | B29C 31/04 | 366/195 |
| 244,415 | A * | 7/1881 | Adams | A47J 27/60 | 99/418 |
| 444,246 | A * | 1/1891 | Maule | F02B 75/02 | 166/227 |
| 568,445 | A * | 9/1896 | Kennedy | B05B 1/046 | 417/165 |
| 579,939 | A * | 3/1897 | Dawson | B29C 48/03 | 425/464 |
| 1,563,490 | A * | 12/1925 | Horton | F16L 55/24 | 239/597 |
| 1,620,412 | A * | 3/1927 | Tweeddale | E21B 43/086 | 166/185 |

(Continued)

FOREIGN PATENT DOCUMENTS

| | | |
|---|---|---|
| CN | 205949003 U | 2/2017 |
| CN | 107441975 A | 12/2017 |

(Continued)

OTHER PUBLICATIONS

International Search report and International Preliminary Report on Patentability for application No. PCT/SE2020/050784 dated Sep. 4, 2020.

(Continued)

*Primary Examiner* — David L Sorkin
(74) *Attorney, Agent, or Firm* — MOSER TABOADA

(57) ABSTRACT

The present invention describes an outflow unit (1) for a mixer (2), said outflow unit (1) comprising multiple individual outflow grooves (3).

17 Claims, 4 Drawing Sheets

(56) References Cited

U.S. PATENT DOCUMENTS

| | | | | | |
|---|---|---|---|---|---|
| 1,964,659 | A * | 6/1934 | Brumberger | D01D 5/253 | 425/464 |
| 2,170,139 | A * | 8/1939 | Goodale | F23D 14/10 | 122/18.1 |
| 2,618,143 | A * | 11/1952 | Mcconaughy | D06F 5/005 | 68/213 |
| 2,636,712 | A * | 4/1953 | Lubbock | F16K 25/04 | 137/329.05 |
| 2,910,725 | A * | 11/1959 | Hildebrandt | D01D 4/02 | 425/464 |
| 3,405,424 | A * | 10/1968 | Imobersteg | D01D 5/24 | 425/464 |
| 3,561,603 | A * | 2/1971 | Salomon | D21D 5/02 | 210/415 |
| 4,011,038 | A * | 3/1977 | Willemsen | B29C 48/345 | 425/464 |
| 4,454,039 | A * | 6/1984 | McCoy | E03F 5/06 | 210/164 |
| 4,740,303 | A * | 4/1988 | Greutert | B01D 29/23 | 55/525 |
| 6,042,263 | A * | 3/2000 | Mentzer | B01F 25/43 | 138/44 |
| 7,793,859 | B2 * | 9/2010 | Kolb | B01J 8/1827 | 239/11 |
| 8,978,776 | B2 * | 3/2015 | Spray | E21B 43/108 | 166/207 |
| 2014/0233348 | A1 | 8/2014 | Yamamoto et al. | | |
| 2015/0343339 | A1 * | 12/2015 | Johnson | B01D 29/15 | 210/497.01 |

FOREIGN PATENT DOCUMENTS

| | | | |
|---|---|---|---|
| CN | 110893328 | A | 3/2020 |
| EP | 0563012 | A1 | 9/1993 |
| EP | 0861711 | A1 | 9/1998 |
| EP | 1436057 | B1 | 4/2006 |
| KR | 20190087268 | A | 7/2019 |

OTHER PUBLICATIONS

European Extended Search Report for Application No. 20853615.1 dated Sep. 14, 2023.

* cited by examiner

OUTFLOW UNIT FOR MIXER

FIELD OF THE INVENTION

The present invention relates to an outflow unit for a mixer.

SUMMARY OF THE INVENTION

The present invention is directed an outflow unit for a mixer, said outflow unit comprising multiple individual outflow grooves.

The outflow unit according to the present invention is intended and adapted for continuous mixers. Therefore, according to one embodiment of the present invention, the mixer is a continuous mixer and the outflow unit is the outflow passage for mixed final product. The mixed final product flowing out through the multiple individual outflow grooves is not admixed again in the mixer. This final product flowing out is already homogenized in the mixer and the final processing is made when passing the multiple individual outflow grooves according to the present invention. This is a clear difference when comparing with e.g. CN 107441975 which discloses another type of mixer device, namely a batch mixer. In this case the mixer is submerged in a solution or mixture so that material passing through the outflow is again admixed in the mixer device and again flowed out through the outflow. This method is performed until the mixture is homogenized in the described batch mixer device.

There are yet several other differences when comparing the outflow unit and mixer according to the present invention with the batch mixer device according to CN 107441975, and these will become clear when reading through the detailed description below.

SPECIFIC EMBODIMENTS

Below some specific embodiments of the present invention are provided and further discussed.

According to one specific embodiment of the present invention, one or more of the outflow grooves 3 are inclined.

According to yet another specific embodiment, one or more of the outflow grooves 3 are oblong. All other possible shapes are also possible according to the present invention. The grooves 3 may be round holes or irregular holes which are more or less round. The shape and length of the grooves 3 is one parameter affecting the type of product result, such as granules or extrudate or other alternatives.

Based on the above, according to one specific embodiment, one or more of the outflow grooves 3 are round, i.e. being holes. As may be understood from above, most of or all the outflow grooves 3 may also be round holes. Round outflow grooves according to the present invention may be of interest when extruding or when producing pellets.

Moreover, it should be noted that also combinations of the different types of outflow grooves, such as both oblong and round, are possible according to the present invention. Furthermore, also combinations of different outflow units according to the present invention are possible. One example is to provide an outflow unit 1 with oblong inclined outflow grooves first and which then is complemented with another outflow unit with round holes. Such a combination of one outflow unit arranged outside of another outflow unit can be of interest for certain applications, such as e.g. when producing a granulate which then is extruded, e.g. certain pharmaceuticals or the like. Based on the above, according to one embodiment of the present invention there is provided a mixer 2 which comprises at least two outflow units 1 having different outflow grooves pattern in relation to each other, and which two outflow units 1 are arranged as a first and then a second outside of the first, to complement each other. The second one is preferably arranged directly outside of the first outflow unit. One such example is shown in FIG. 7.

In relation to inclination and shape, it should be noted that many different alternatives are possible according to the present invention. For instance, one example is a fishbone shape of the multiple individual outflow grooves 3. Therefore, according to one specific embodiment of the present invention, the multiple individual outflow grooves are arranged in a fishbone shape. Such a shape may be arranged in different ways according to the present invention. One example is as two rows of individual oblong grooves, which rows then are inclined different directions, and thus creating the fishbone shape. Moreover, a fishbone shape then enables spraying both upwards and downwards.

Besides the shape of the outflow grooves 3 also other aspects are of interest in relation to features of the outflow. Non-limiting examples are the size of the outflow grooves, certain angles as disclosed below, the placement and shape of the grating material provided between the outflow grooves. Therefore, both holes or outflow grooves and grating material are of interest for the end result.

Moreover, according to yet another embodiment, several of the outflow grooves 3 have the same shape, preferably wherein substantially all of the outflow grooves 3 have the same shape. As seen in the figures, this does not have to imply that all of the outflow grooves 3 have the same size. For instance, the end grooves 3 may have the same general shape but have a smaller size then the rest of the grooves 3. One such example is shown in FIG. 1.

According to one specific embodiment, the multiple individual outflow grooves 3 are inclined in relation to an imaginary vertical axis, preferably with an angle of maximum 75 degrees as calculated from the imaginary vertical axis, either to a right or to a left side of the imaginary vertical axis. This may also be expressed so as wherein an outlet width (OW) is arranged with an angle from a center point of the mixer 2 towards the multiple grooves 3 in a range of +/−75 degrees. This is shown in FIG. 3. According to yet another specific embodiment of the present invention, each of the multiple individual outflow grooves 3 is inclined with the same inclination angle in relation to an imaginary vertical axis.

Moreover, also other device angles may be of relevance according to the present invention. According to one embodiment, a vertical outflow angle (VOA) from the multiple grooves 3 is provided in the range of +/−75 degrees in relation to an imaginary vertical axis. This is depicted in FIG. 4. Furthermore, this angle may be of importance for the provision of strong granule properties.

Furthermore, according to yet another embodiment, a radial outflow angle (ROA) from the multiple grooves 3 is provided in the range of +/−35 degrees in relation to an imaginary horizontal axis. This is depicted in FIG. 5. Furthermore, the present invention also refers to a mixer 2. Therefore, according to one embodiment, the present invention refers to a mixer 2 comprising an outflow unit 1 according to the present invention. One mixer example is shown in FIG. 6 where both inflow 7 and outflow 3 are shown.

According to yet another embodiment, the mixer 2 comprises a mixing chamber 4 and wherein a most upper part 5 of the outflow grooves 3 are arranged above a top of the mixing chamber 4. This type of arrangement may be of interest to ensure that granules or material being produced are flowed out from the mixer 2 and no material or at least a small amount gets stuck or provides build up inside of the mixer 2. This type of arrangement provides a form of edge in the outflow unit 1 of the mixer device. This has proven to be efficient when mixing dough material, but also other material types.

Furthermore, the top (or end ceiling) 6 of the mixing chamber 4 may be inclined upwards to ensure that all produced material is flown out from the mixing chamber 4 and mixer 2 and does not loop inside of the mixing chamber 4 to be mixed "another time" when such material, e.g. granules, are produced and thus mixed as intended. One such inclination is shown in FIG. 2.

Moreover, according to one specific embodiment, the mixer 2 comprises one inflow 7 which is arranged with a movable scraper, preferably an arch breaker. The movable scraper is suitably arranged in relation to the inflow 7 to create an even inflow to the mixing chamber 4 and thus an even flow to the outflow grooves 3. This arrangement with a movable scraper is of interest when powder with a high moisture content is fed into the mixer. One such example is powder which contains starch. With the movable scraper a build up of starch is prevented inside of the mixer 2. So not only the mixture quality is under better control. This also enables a wider range of powder applications, e.g. make waste products from vegan protein products manufacturing usable. Moreover, another benefit is that the outflow grooves 3 may in certain cases easier do what they are designed to do.

It should be noted that a mixer according to the present invention may comprise several inflows, such as at least two inflows so that powder is fed into one inlet and liquid or gas is fed into another inlet. The two phases are met inside of the mixing chamber 4 of the mixer 2. Furthermore, the mixer 2 according to the present invention may also comprise only one inlet. In such cases the mixer 2 may in fact functionalize as a reshaper. For example, an inflow of only powder may be used and then the mixer acts for reshaping of the powder and/or for creating of new properties of the inflow powder.

Furthermore, the present invention is also directed to a method for mixing, said method comprising using a mixer according to the present invention. Moreover, according to one specific embodiment of the present invention, wherein an outlet width (OW) is arranged with an angle from a center point of the mixer towards the multiple grooves 3 in a range of +/−75 degrees, and wherein a deviation in the range of +/−19 degrees is provided in relation to the horizontal outflow angle when a mixing material is sprayed out from the multiple grooves 3. This deviation is also depicted in FIG. 3 as the angle D. The angle and deviation described above provides for a better granule property in the produced end material. As an example, a beneficial granule distribution may be obtained according to the present invention.

As hinted above, the method according to the present invention may be used to produce granules, but also extrudate, or moistened powder are preferred alternatives. Therefore, according to one embodiment, the method according to the present invention involves producing granules, an extrudate, or heat treated and/or moistened powder. Moreover, one non-limiting example of an application of interest is starch based granules. Another example is a strong dough with a high content of air, such as baguettes. Yet another one is mixed products which is of interest to cool down quickly. Also in all these cases, the angles and deviation mentioned above may be of importance for the end result and which type of product that is of interest.

Figure 1:
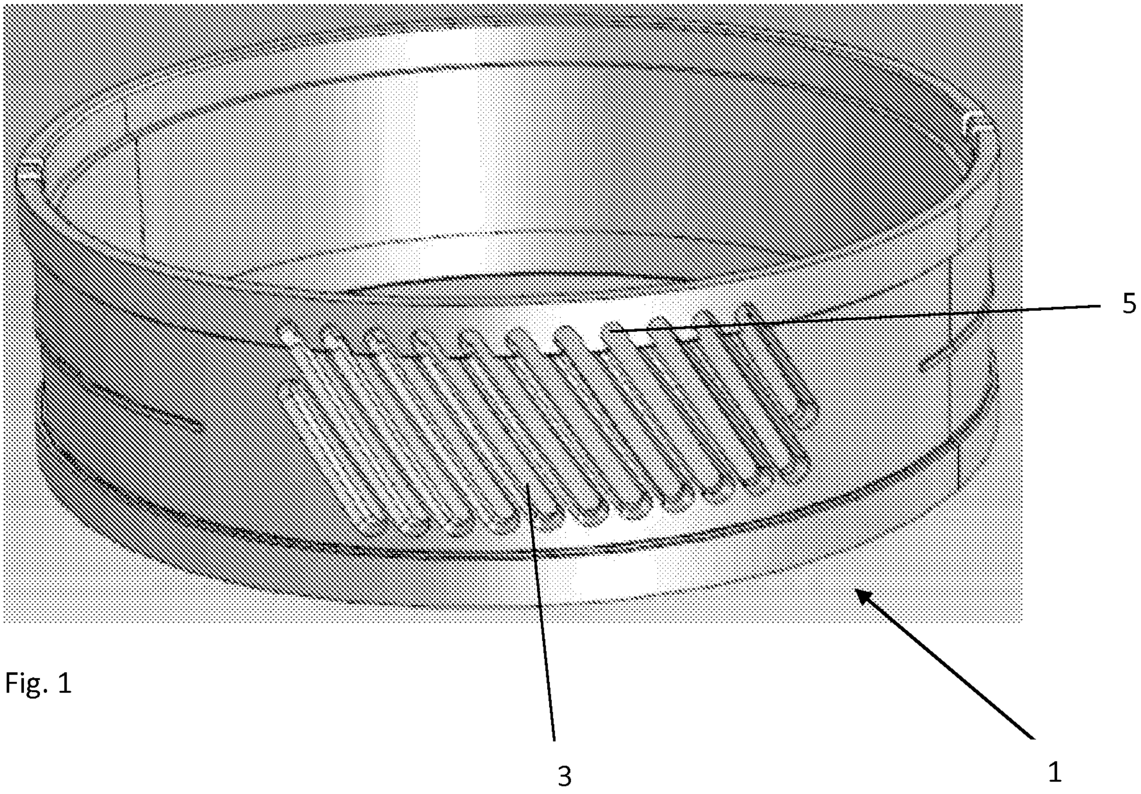
In FIG. 1 there is shown an outflow unit according to one embodiment of the present invention.
Figure 2:
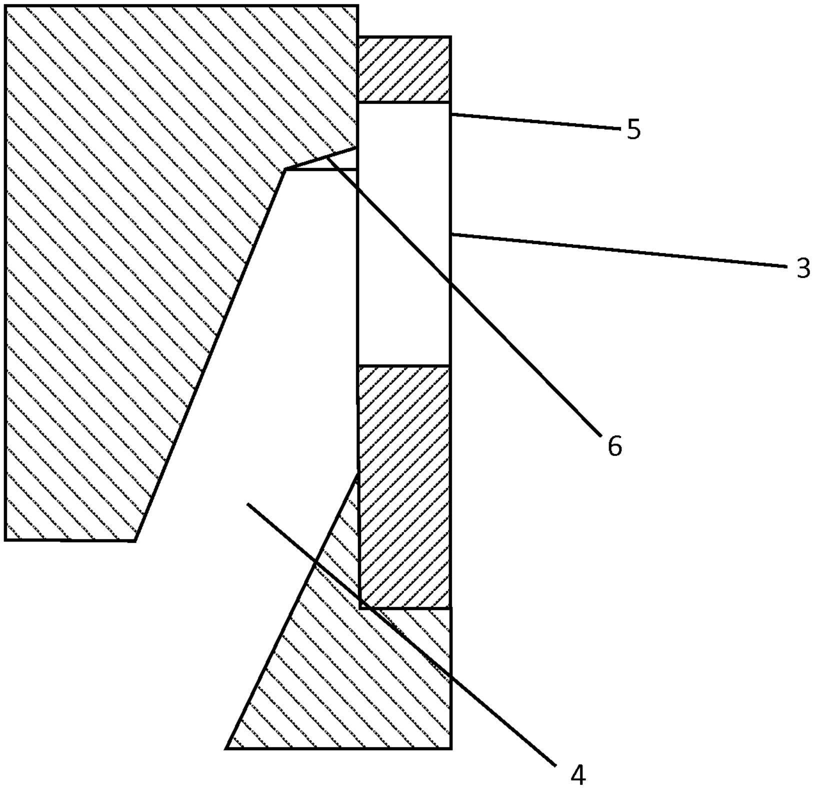
In FIG. 2 there is shown a part of a mixer and an outflow unit according to one embodiment of the present invention.
Figure 3:
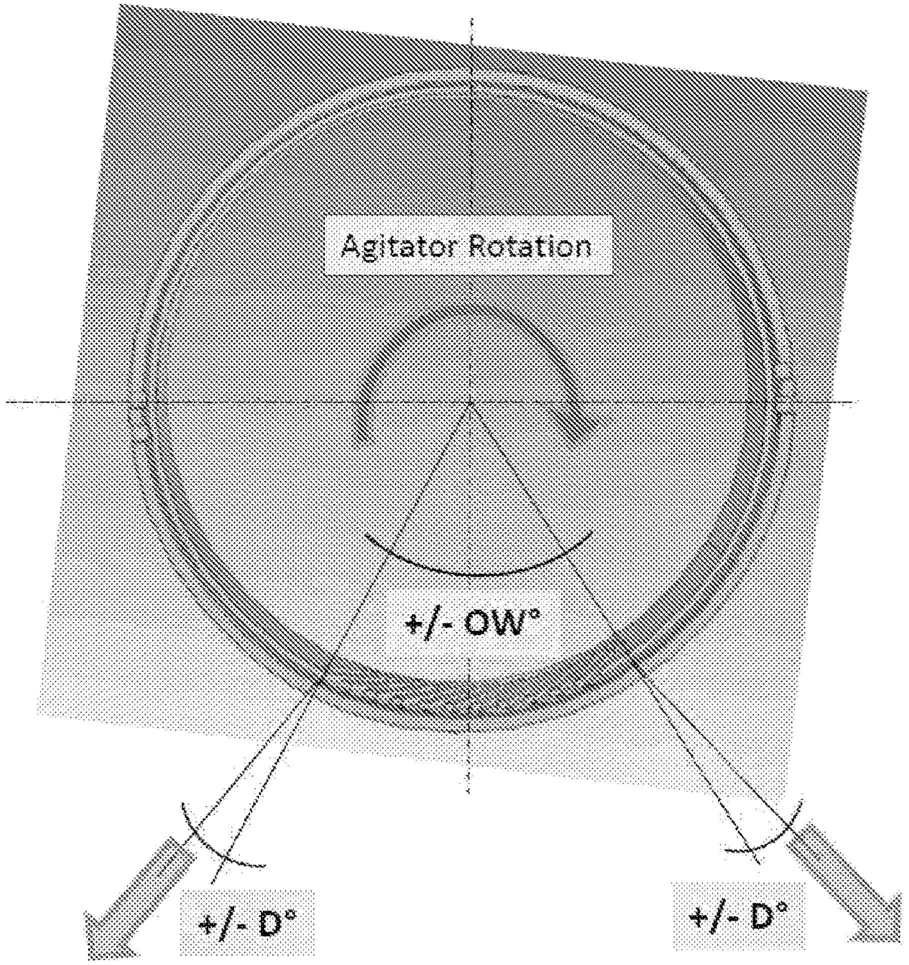
In FIG. 3 there is shown an outflow unit according to FIG. 1 with the outlet width (OW) angle and the deviation (D) in relation to the outlet width (OW) angle which is obtained out from the multiple outflow grooves.
Figure 4:
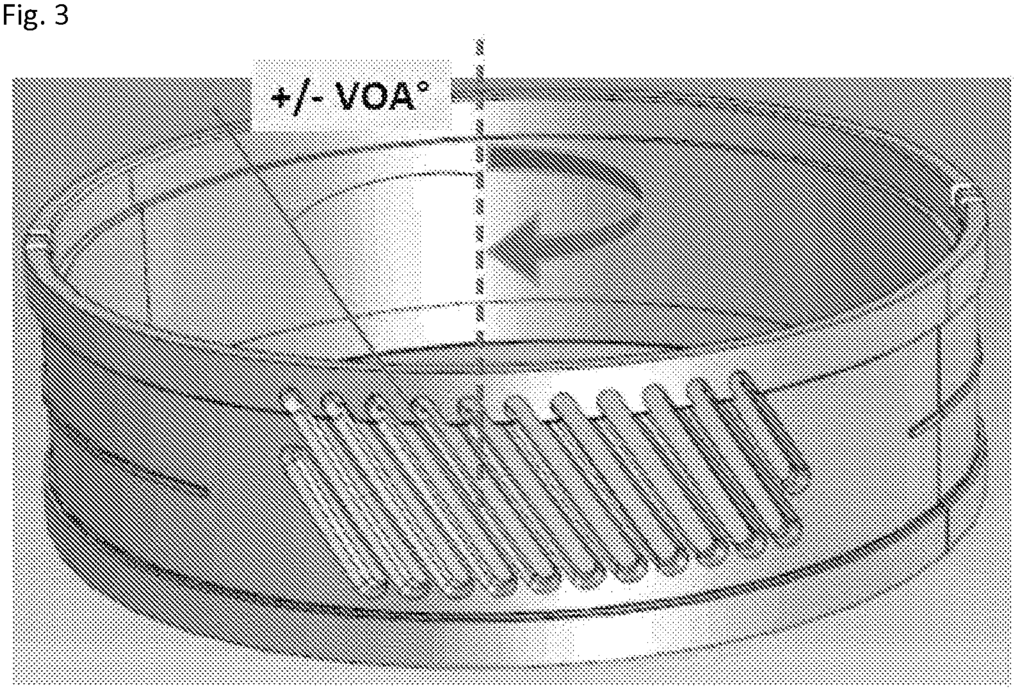
In FIG. 4 there is shown an outflow unit according to FIG. 1 with the vertical outflow angle (VOA).
Figure 5:
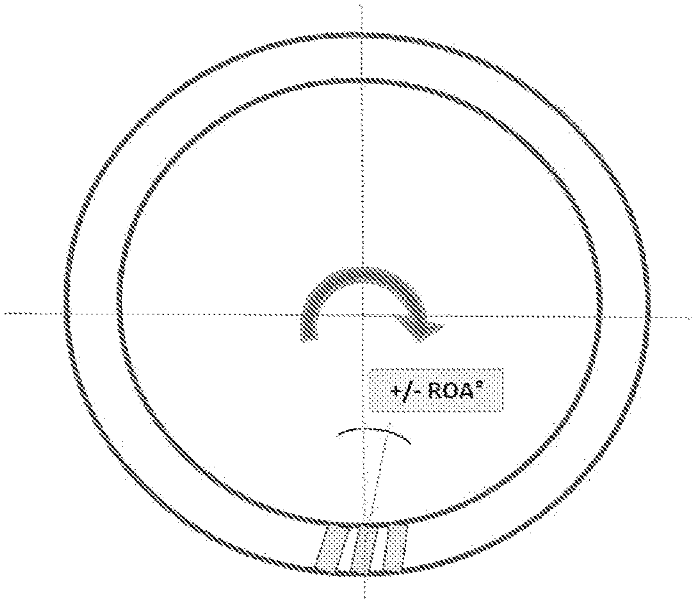
In FIG. 5 there is shown an outflow unit according to FIG. 1 with the radial outflow angle (ROA).
Figure 6:
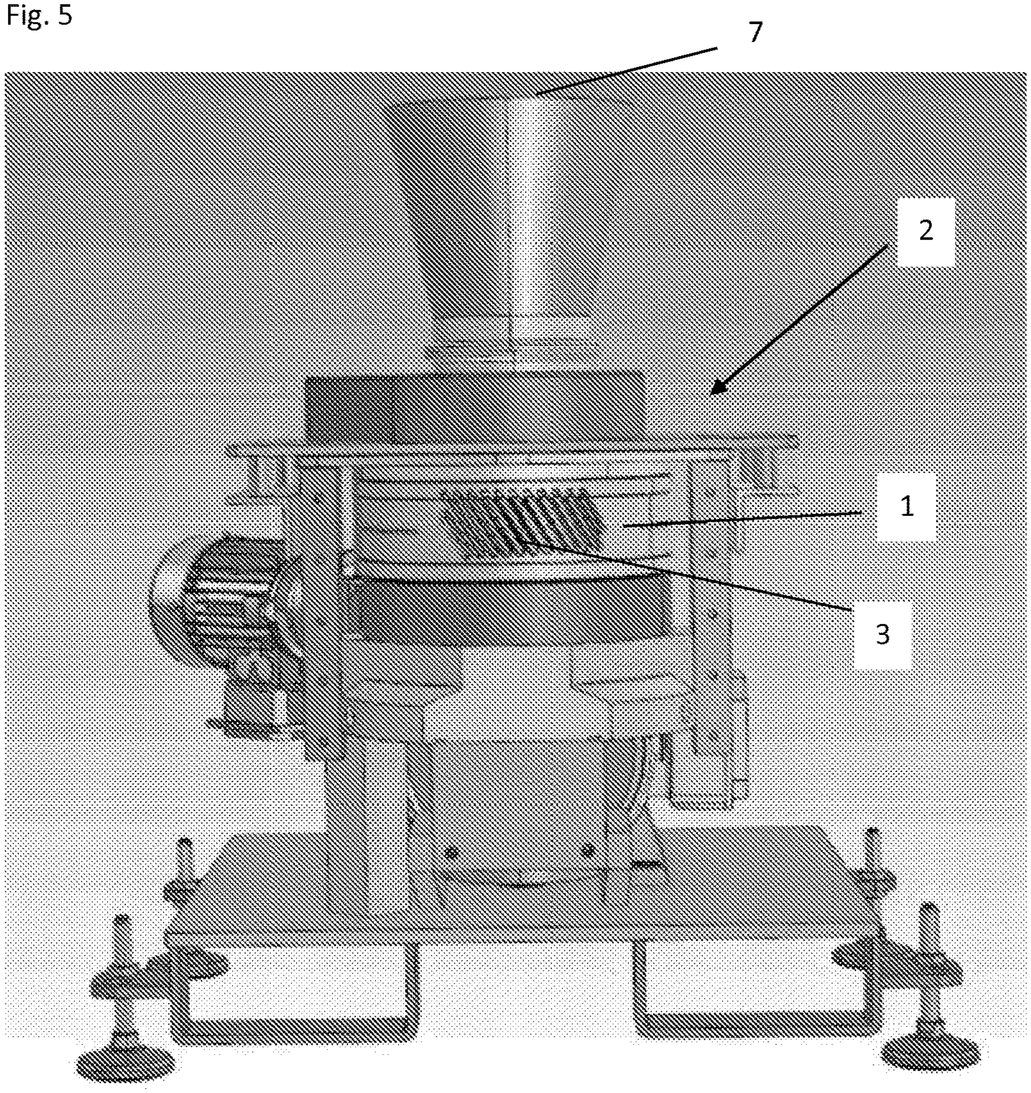
In FIG. 6 there is shown a mixer unit according to one embodiment of the present invention.
Figure 7:
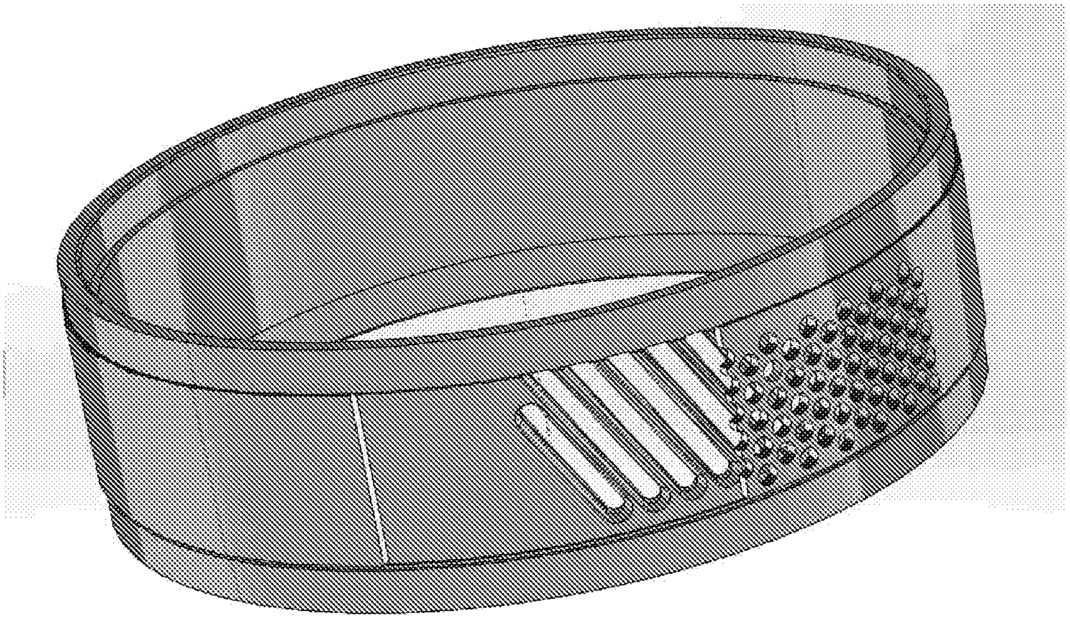
In FIG. 7 there is shown one possible alternative of an outflow unit according to one embodiment of the present invention. In this embodiment two different outflow types with different groove types in relation to each other complement each other.

The invention claimed is:

1. An outflow unit for a continuous mixer, said outflow unit comprising multiple individual outflow grooves, wherein a vertical outflow angle (VOA) from the multiple individual outflow grooves is provided in the range of +/−75 degrees in relation to an imaginary vertical axis, wherein the outflow unit defines an outflow passage of the continuous mixer through which mixed final product passes from the continuous mixer, and wherein the multiple individual outflow grooves are oblong and inclined, and wherein the multiple individual outflow grooves are arranged as continuous openings of the outflow unit, said outflow unit being a one-piece unit configured to connect to a continuous mixer configured to fixate the outflow unit to the continuous mixer,
wherein the outflow unit has a vertical sidewall and the multiple individual outflow grooves are arranged in the vertical sidewall, wherein the vertical sidewall is annular, and wherein the individual outflow grooves are only arranged at a section of the vertical sidewall so that the lateral surface area of at least 50% of the circumference of the vertical sidewall is free from outflow grooves.

2. The outflow unit according to claim 1, wherein the multiple individual outflow grooves are arranged in a fishbone shape.

3. The outflow unit according to claim 1, wherein several of the outflow grooves have the same shape.

4. The outflow unit according to claim 1, wherein each of the multiple individual outflow grooves is inclined with the same inclination angle in relation to the imaginary vertical axis.

5. The outflow unit according to claim 1, wherein a radial outflow angle (ROA) from the multiple individual outflow grooves is provided in the range of +/−35 degrees in relation to an imaginary horizontal axis.

6. A continuous mixer comprising the outflow unit according to claim 1.

7. The mixer according to claim 6, wherein the continuous mixer comprises a mixing chamber and wherein an uppermost part of the outflow grooves are arranged above a top of the mixing chamber.

8. The mixer according to claim 6, wherein the continuous mixer comprises at least two outflow units having different outflow grooves pattern in relation to each other, and which two outflow units are arranged as a first outflow unit and a second outflow unit outside of the first outflow unit, to complement each other.

9. The mixer according to claim 6, wherein the continuous mixer comprises an inflow which is arranged with a movable scraper.

10. A method for mixing, said method comprising:

mixing a product using the continuous mixer according to claim 6 into a mixed final product; and passing the mixed final product through the outflow passage.

11. The method for mixing according to claim 10, wherein an outlet width (OW) is arranged with an angle from a center point of the mixer towards the multiple individual outflow grooves in a range of +/−75 degrees, and wherein a deviation in the range of +/−19 degrees is provided in relation to the horizontal outflow angle when a mixing material is sprayed out from the multiple individual outflow grooves.

12. The method according to claim 10, wherein the method includes producing granules, an extrudate or moistened powder as the mixed final product.

13. The outflow unit according to claim 1, wherein substantially all of the outflow grooves have the same shape.

14. The outflow unit according to claim 1, wherein the multiple individual outflow grooves have rounded ends.

15. The outflow unit according to claim 1, wherein a deviation in the range of +/−19 degrees is provided in relation to a horizontal outflow angle when a mixing material is sprayed out from the multiple individual outflow grooves.

16. The outflow unit according to claim 1, wherein substantially all of the multiple individual outflow grooves have the same shape, and wherein at least one individual outflow groove of the multiple individual outflow grooves has a shorter outflow groove length, measured from one end to another other end, in comparison to other individual outflow grooves of the multiple individual outflow grooves.

17. The outflow unit according to claim 1, wherein the multiple individual outflow grooves are inclined both in relation to a vertical plane and a horizontal plane of the outflow unit.

* * * * *